US009959983B2

(12) United States Patent
Gardner et al.

(10) Patent No.: US 9,959,983 B2
(45) Date of Patent: May 1, 2018

(54) ROBUST POROUS ELECTRODES FOR ENERGY STORAGE DEVICES

(71) Applicant: Intel Corporation, Santa Clara, CA (US)

(72) Inventors: Donald S. Gardner, Los Altos, CA (US); Charles W. Holzwarth, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1011 days.

(21) Appl. No.: 13/929,972

(22) Filed: Jun. 28, 2013

(65) Prior Publication Data
US 2015/0004480 A1    Jan. 1, 2015

(51) Int. Cl.
| | |
|---|---|
| *H01G 11/24* | (2013.01) |
| *H01G 11/32* | (2013.01) |
| *H01G 11/50* | (2013.01) |
| *H01G 11/86* | (2013.01) |
| *H01M 4/04* | (2006.01) |
| *H01M 4/134* | (2010.01) |
| *H01M 4/36* | (2006.01) |

(Continued)

(52) U.S. Cl.
CPC ............ *H01G 11/24* (2013.01); *H01G 11/30* (2013.01); *H01G 11/32* (2013.01); *H01G 11/50* (2013.01); *H01G 11/86* (2013.01); *H01M 4/0428* (2013.01); *H01M 4/134* (2013.01); *H01M 4/1395* (2013.01); *H01M 4/362* (2013.01); *H01M 4/386* (2013.01); *H01M 4/624* (2013.01); *H01M 10/05* (2013.01); *H01M 10/0567* (2013.01); *Y02E 60/13* (2013.01); *Y10T 29/49117* (2015.01)

(58) Field of Classification Search
CPC ..... H01G 11/24; H01M 4/0473; H01M 4/134
See application file for complete search history.

(56) References Cited

U.S. PATENT DOCUMENTS

| | | | |
|---|---|---|---|
| 2011/0102002 A1* | 5/2011 | Riehl | B82Y 30/00 324/693 |
| 2012/0100438 A1 | 4/2012 | Fasching et al. | |

(Continued)

FOREIGN PATENT DOCUMENTS

| | | |
|---|---|---|
| CN | 102104703 A | 6/2011 |
| GB | 2492167 | 12/2012 |

(Continued)

OTHER PUBLICATIONS

PCT Application PCT/US2014/043881; filing date Jun. 24, 2014; Intel Corporation et al.; International Search Report dated Oct. 27, 2014.

(Continued)

*Primary Examiner* — Stephan Essex
(74) *Attorney, Agent, or Firm* — Thorpe North & Western, LLP; David W. Osborne

(57) ABSTRACT

Electrodes, energy storage devices using such electrodes, and associated methods are disclosed. In an example, an electrode for use in an energy storage device can comprise porous silicon having a plurality of channels and a surface, the plurality of channels opening to the surface; and a structural material deposited within the channels; wherein the structural material provides structural stability to the electrode during use.

20 Claims, 7 Drawing Sheets

(51) Int. Cl.
*H01M 4/38* (2006.01)
*H01M 4/485* (2010.01)
*H01M 4/70* (2006.01)
*H01M 10/0567* (2010.01)
*H01G 11/30* (2013.01)
*H01M 4/1395* (2010.01)
*H01M 4/62* (2006.01)
*H01M 10/05* (2010.01)

(56) References Cited

U.S. PATENT DOCUMENTS

2013/0344396 A1* 12/2013 Bosnyak ............ H01M 2/1653
429/307
2014/0370380 A9 12/2014 Cui et al.

FOREIGN PATENT DOCUMENTS

| JP | H10-135080 A | 5/1998 | |
|----|----|----|----|
| JP | 2001-338847 A | 12/2001 | |
| JP | 2007/141666 A | 6/2007 | |
| JP | 2010-541260 A | 12/2010 | |
| JP | 2011/138814 A | 7/2011 | |
| JP | 2012/084521 A | 4/2012 | |
| JP | 4968977 B2 | 7/2012 | |
| JP | 2013/506094 A | 2/2013 | |
| WO | WO 2011/123135 A1 | 10/2011 | |
| WO | WO 2011123135 A1 * | 10/2011 | ............ H01G 11/36 |
| WO | WO 2013048465 A1 * | 4/2013 | ............ H01G 11/26 |

OTHER PUBLICATIONS

Chan et al.; Solution-Grown Silicon Nanowires for Lithium-Ion Battery Anodes; ACS Nano; Mar. 2010; pp. 1443-1450; vol. 4, No. 3; American Chemical Society.

Chen et al.; Virus-Enabled Silicon Anode for Lithium-Ion Batteries; ACS Nano; Aug. 13, 2010; pp. 5366-5372; vol. 4, No. 9; American Chemical Society.

Graetz et al.; Highly Reversible Lithium Storage in Nanostructured Silicon; Electromechanical and Solid State Letters; Jul. 2003; pp. A194-A197; vol. 6, Issue 9; The Electromechanical Society.

Green et al.; Sturctured Silicon Anodes for Lithium Battery Applications; Electromechanical and Solid State Letters; Mar. 2003; pp. A75-A79; vol. 6, Issue 5; The Electromechanical Society.

Hieu et al.; Free-standing silicon nanorods on copper foil as anode for lithium-ion batteries; Microelectronic Engineering; Jan. 2012; pp. 138-140; vol. 89; Elsevier B.V.

Li et al.; A High Capacity Nano Si Composite Anode Material for Lithium Recjhargeable Batteries; Electromechanical and Solid State Letters; Sep. 1999; pp. 547-549; vol. 2, Issue 11; The Electromechanical Society.

Thakur et al.; Freestanding Macroporous Silicon and Pyrolyzed Polyacrylonitrile As a Composite Anode for Lithium Ion Batteries; Chemistry of Materials; Jul. 2012; pp. 2998-3003; vol. 24; American Chemical Society.

* cited by examiner

ROBUST POROUS ELECTRODES FOR ENERGY STORAGE DEVICES

TECHNICAL FIELD

Embodiments described herein relate generally to energy storage devices, and relate more particularly to batteries and capacitors.

BACKGROUND

Energy storage devices, including batteries and capacitors, are used in electronic devices and operations. In particular, capacitors of various types are frequently used in devices and applications such as electrical circuitry, power delivery, voltage regulation, and battery replacement. Through ongoing development, several capacitor types have emerged. For example, electric double-layer capacitors (EDLCs), also referred to as ultracapacitors, are characterized by high energy storage and power density, small size, and low weight. Such devices have thus become promising candidates for use in several applications including rechargeable batteries.

Porous materials, such as porous carbon and silicon have been considered for use as electrode substrates in energy storage devices due to their ability to provide large surface areas. These materials can hold charge carriers such as lithium. Certain conductive materials could be desirable for use with such porous substrates. However, in many cases the addition of a selected material to the substrate in order to achieve certain advantages may also present a number of disadvantages. For example, some materials such as lithium may provide high specific charge capacities and energy densities, but may cause instability of the substrate. As such, research efforts into energy storage devices and related materials continue.

BRIEF DESCRIPTION OF THE DRAWINGS

Disclosed embodiments will be apparent from the detailed description which follows, taken in conjunction with the accompanying drawings, which together illustrate, by way of example, various invention features; and, wherein.

Figure 1:
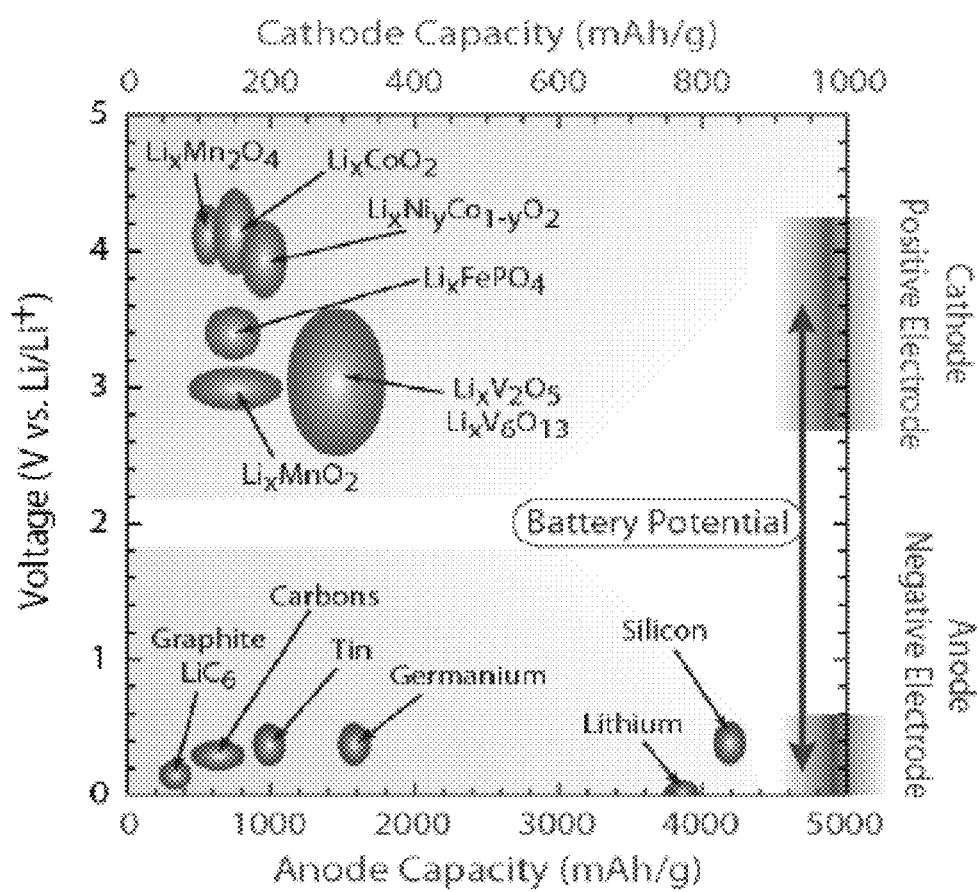
FIG. 1 is a plot of voltage vs. anode and cathode capacity for various systems in accordance with certain invention embodiments.

Reference will now be made to the exemplary embodiments illustrated, and specific language will be used herein to describe the same. It will nevertheless be understood that no limitation is thereby intended.

DESCRIPTION OF EMBODIMENTS

Although the following detailed description contains many specifics for the purpose of illustration, a person of ordinary skill in the art will appreciate that many variations and alterations to the following details are within the scope of the herein disclosed embodiments.

Accordingly, the following embodiments are set forth without any loss of generality to, and without imposing limitations upon, any claims set forth herein. Before invention embodiments are described in greater detail, it is to be understood that this disclosure is not limited to the particular embodiments described. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a structural material" includes a plurality of such materials.

In this disclosure, "comprises," "comprising," "containing" and "having" and the like can have the meaning ascribed to them in U.S. Patent law and can mean "includes," "including," and the like, and are generally interpreted to be open ended terms. The term "consisting of" is a closed term, and includes only the components, structures, steps, or the like specifically listed, and that which is in accordance with U.S. Patent law. "Consisting essentially of" or "consists essentially" or the like, when applied to methods and compositions refers to compositions like those disclosed herein, but which may contain additional structural groups, composition components or method steps. Such additional structural groups, composition components or method steps, etc., however, do not materially affect the basic and novel characteristic(s) of the compositions or methods, compared to those of the corresponding compositions or methods disclosed herein. In further detail, "consisting essentially of" or "consists essentially" or the like, when applied to methods and compositions encompassed by the present disclosure have the meaning ascribed in U.S. Patent law and the term is open-ended, allowing for the presence of more than that which is recited (e.g., trace contaminants, components not reactive with porous silicon substrate, and the like) so long as basic or novel characteristics of that which is recited is not changed by the presence of more than that which is recited, but excludes prior art embodiments. When using an open ended term, like "comprising" or "including," it is understood that direct support should be afforded also to "consisting essentially of" language as well as "consisting of" language as if stated explicitly.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment" herein do not necessarily all refer to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous.

As used herein, "electrolyte" and "ion containing electrolyte" may be used interchangeably and include solid electrolytes and liquid electrolyte solutions unless otherwise specified.

As used herein, "structural material" refers to a material that can be deposited within the channels, openings, or pores of a porous substrate in order to provide structural support for the porous substrate. In some aspects, such a material may allow for diffusion of an electrolyte to the porous material and provide structural support in the event of an expansion or contraction of the porous material upon interacting with the electrolyte. In other aspects, the structural material may have a higher diffusion rate with respect to the electrolyte than does the porous material. In one example, the structural material can be a material that has a higher diffusion rate with lithium than the diffusion rate of lithium with porous silicon.

As used herein, "substantial" and "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context. Similarly, "substantially free of" or the like refers to the lack of an identified element or agent in a composition. Particularly, elements that are identified as being "substantially free of" are either completely absent from the composition, or are included only in amounts which are small enough so as to have no measurable effect on the composition.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Example Embodiments

An initial overview of technology embodiments is provided below and specific technology embodiments are then described in further detail. This initial summary is intended to aid readers in understanding the technology more quickly but is not intended to identify key or essential features of the technology, nor is it intended to limit the scope of the claimed subject matter.

It has been recognized that energy storage devices, e.g. rechargeable batteries, using traditional materials can have various limitations or disadvantages such as low energy densities, low charge capacities, low power density, low structural integrity, safety issues and toxicity. For example, lithium batteries with metallic lithium anodes pose safety issues. As a result, lithium-ion batteries were developed in which both electrodes are made of a material containing lithium ions. Lithium-ion batteries using carbon anodes have become widespread because the energy density of lithium-ion is typically twice that of the standard nickel-cadmium. The load characteristics are reasonably good and behave similarly to nickel-cadmium in terms of discharge. Various electrode systems are shown in FIG. 1 having cathode capacities ranging from about 100 to about 400 mA h/g and anode capacities ranging from about 300 to about 4000 mA h/g. As such, there is still potential for lithium-ion batteries to achieve even higher energy densities. When silicon is used as an anode, the charge storage capacity can be increased 10 times over that of carbon. For example, a high charge capacity for the anode, (i.e. up to 4,200 mA h/g, or up to 2,000 mA h/g if intercalated lithium ions are factored in) can be attained. However, the lithium/silicon combination often suffers from high volume increase, which can lead to disintegration of the active material upon cycling. Thus, longevity becomes problematic.

Embodiments of the present disclosure provide energy storage devices having stabilized electrodes and result in benefits previously unachieved. Additionally, embodiments of the disclosure are capable of significantly increasing the performance characteristics of energy storage devices, such as lithium-ion batteries, by providing for improved energy density, longevity, and power output, among other things. Such benefits may be achieved, at least in part, by reinforcing a porous material with a structural material. In some aspects, an ion has a higher diffusion rate in the structural material than in the porous material. Such properties can allow the electrode to achieve high charge capacities while still providing structural support during cycling. Exemplary electrodes and energy storage devices are discussed in detail below.

Accordingly, in various embodiments, an electrode for use in an energy storage device can comprise porous silicon having a plurality of channels and a surface. The plurality of channels can open to the surface, and a structural material can be deposited within the channels. Generally, the structural material provides structural stability to the electrode during use.

In other embodiments, energy storage devices can utilize an electrode having an electrolyte and a porous material reinforced with a structural material. Similarly, yet other embodiments provide various specific pairings of electrolyte and structural material-reinforced porous materials. Such embodiments can achieve stable, high capacity electrodes.

Typically, an energy storage device can comprise a first electrode including porous material, such as porous silicon and an ion containing electrolyte. The first electrode can have a plurality of channels and a surface, where the plurality of channels opens to the surface. Additionally, the porous material can contain a structural material within the channels and the ion containing electrolyte. The ions can have a higher diffusion rate in the structural material than in the porous material.

Figure 2:
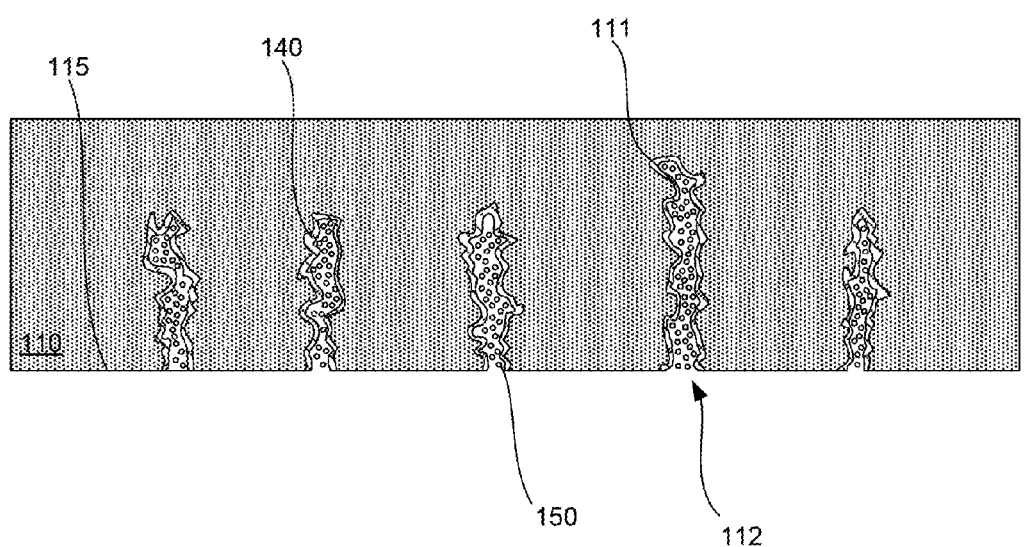
FIG. 2 is a cross-sectional view of an electrode in accordance with various invention embodiments.

Referring to FIG. 2, an electrode 110 can comprise a plurality of channels 111 with openings 112 to a surface 115. The electrode generally includes a structural material 140 deposited within the channels 111. Additionally, as shown, the electrode can include an ion containing electrolyte 150. As discussed herein, the structural material stabilizes the electrode during use, e.g., during cycling in a rechargeable battery. As shown in FIG. 2, the structural material takes the form of a coating on the interior surface of the channels. The thickness of the coating of structural material may vary according to the specific materials used, purpose for the electrode, degree of reinforcement required, or other desired results to be achieved. In some aspects the coating may be thickened to the point that the channels are substantially filed with the structural material. Such embodiments are discussed further in connection with FIG. 6.

The electrode can be manufactured from various porous materials as known in the art. In one embodiment, the electrode can be manufactured from porous silicon. Other materials that may be especially well-suited for electrode and energy storage devices according to embodiments of the disclosure are porous germanium, porous tin, and titanium dioxide. Possible advantages of using porous silicon include its compatibility with existing silicon technology, inexpensive raw material, and high storage capacity. Porous germanium enjoys similar advantages as a result of existing technology for that material, high storage capacity and, as compared to silicon, enjoys the further possible advantage that its native oxide (germanium oxide) is water-soluble and so is easily removed. (The native oxide that forms on the surface of silicon reduces its conductivity which is an undesirable result) Porous germanium is also highly compatible with silicon technology. However, the raw material cost of germanium is significantly more than silicon. Possible advantages of using porous tin, which is a zero-band-gap material, include its enhanced conductivity with respect to certain other conductive and semiconductive materials and every atom of tin can adsorb four atoms of lithium. Possible advantages of using titanium dioxide include good diffusion of lithium but blocking of electron flow so as to reduce electrochemical side reactions.

Regarding the porous material, the present electrodes can be manufactured to have a target porosity. Such porosity can be achieved using etching techniques, as described herein, or other known techniques as known in the art. The porosity generally allows for the expansion of the porous material during use, e.g., lithiation of porous silicon. In one example, the porosity can be 50% or more. Other examples of porosity include 60% or more, 70% or more, or even 80% or more.

Other materials may also be used for the porous structure, including silicon carbide, alloys such as an alloy of silicon and germanium, and metals such as copper, aluminum, nickel, calcium, tungsten, molybdenum, and manganese.

Some embodiments of the disclosure may make use of very narrow channels in the porous material. In certain embodiments (to be described in detail below), an electrolyte is introduced into the channels. In such embodiments the size of the channels will be sufficient to allow entry of the electrolyte. Certain electrolytes may have solvated ions on the order of 2 nanometers (nm). In at least one embodiment, therefore, a smallest dimension of each one of the channels is no less than 2 nm so as to permit the electrolyte to flow freely along the entire length of the channels.

In the same or another embodiment the smallest dimension of each one of the channels is no greater than 1 micrometer ($\mu$m). This upper size limit for the smallest dimension of the channels may be chosen for particular embodiments in order to maximize the surface area of the porous structures of those embodiments. In some batteries, the transfer of ions from the electrolyte to the electrode material is the kinetically limiting reaction, and therefore surface area must be maximized to increase power. Smaller (e.g., narrower) channels lead to increased overall surface area for each electrode because a larger number of such narrower channels can fit into an electrode of a given size. (The channels' other dimensions, e.g., their lengths and/or shapes, may also be manipulated in order to increase surface area (or to achieve some other result). In other embodiments the smallest dimension of the channels may be larger than 1 $\mu$m—perhaps as large as 10 $\mu$m or more. Although they would decrease the surface area, such larger channels may provide more interior space in which to grow or otherwise form additional structures, if needed.

Porous structures according to embodiments of the disclosure can be fabricated with very precise and uniform pore size control. This allows fast charging and also improves the capacity (pore size may be optimized for fast/efficient diffusion of ions through the pores to the maximum amount of surface area).

Figure 3:
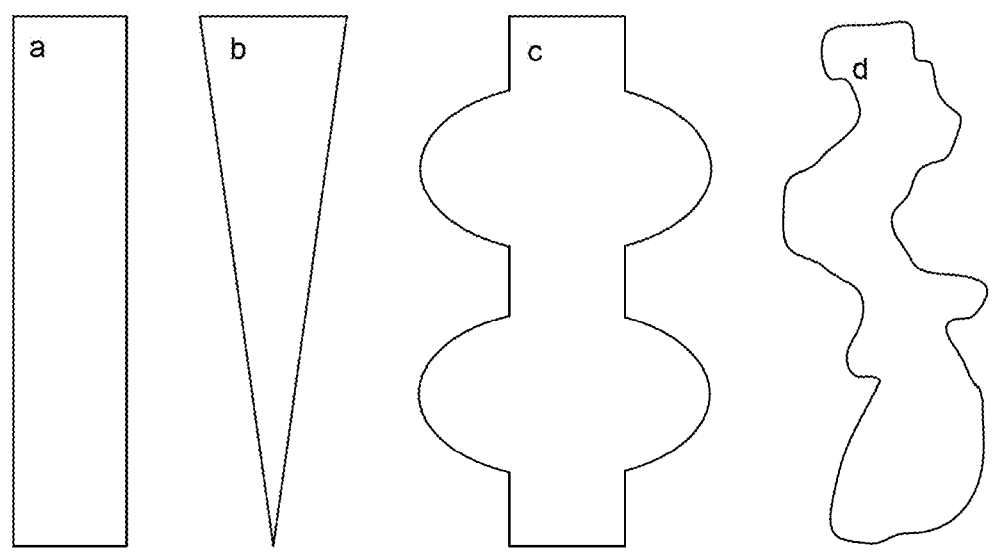
FIG. 3 illustrates different pore shapes in accordance with various invention embodiments.

Referring to FIG. 3, the present pores or channels can be formed in various shapes as needed to attain a desired result or advantage. In various embodiments, the pores can be substantially straight (A), tapered (B), include cavities (C), or be random (D). Other pore morphology can include various geometrical shapes including substantially rectangular, triangular, conical, elliptical, spherical, or other shapes, or combinations thereof, etc.

As discussed herein, the structural material can stabilize the electrode during use. Typically, the structural material allows for the ions present in the electrolyte to diffuse readily through it while providing mechanical support during electrolyte interaction with the porous material (e.g., volume changes such as swelling from lithiation). For example, when silicon is used as the anode with lithium, the resulting alloy can have a stoichiometry of up to $Li_{22}Si_5$. This presents a potential volume change in the silicon of between 140% to about 300%. Similarly, when tin is used as the anode with lithium, the resulting alloy can have a stoichiometry of up to $Li_{22}Sn_5$. In some embodiments, the shape of the channels 111 can be selected so as to compensate for or otherwise capitalize on expansion of the porous material.

A variety of materials and elements may be suitable for use as the structural material and in certain embodiments, selection of such materials may be made based at least in part on the type of porous material used, the amount of volume change expected upon addition of the electrolyte, and the diffusion rates of the electrolyte in the structural material and porous material respectively. In one embodiment, the structural material 140 can comprise carbon. In another embodiment, the structural material may be a coating of graphite, a carbon-based polymer, or a silicon carbide.

Other materials include titanium, e.g. titanium dioxide. These materials may be applied using processes such as electroplating, chemical vapor deposition (CVD), and/or atomic layer deposition (ALD). For example, titanium dioxide can be deposited into porous silicon by ALD.

As shown in FIG. 2, in some embodiments, an ion containing electrolyte 150 can be present. The ion containing electrolyte 150 (as well as other electrolytes described herein) is represented in the drawings using a random arrangement of circles. This representation is intended to convey the idea that the electrolyte is a substance (liquid or solid) containing free ions. The electrolyte describes both the ions as well as the material that fills the space between the ions. The circles were chosen for convenience and are not intended to imply any limitation as to the electrolyte components or qualities, including any limitation with respect to the size, shape, or number of the ions. A typical, though not the only, type of electrolyte that may be used in accordance with embodiments of the disclosure is an ionic solution. In one embodiment, the electrolyte can be an organic electrolyte. As one example, the electrolyte can be a liquid or solid solution of organic materials such as lithium hexafluorophosphate in diethyl carbonate. Other examples include solutions based on boric acid, sodium borate, or weak organic acids. Generally, the electrolyte is a mixture of organic carbonates such as ethylene carbonate or diethyl carbonate containing complexes of lithium ions. As such, in one example, the electrolyte can comprise a lithium salt. These non-aqueous electrolytes generally use non-coordinating anion salts such as lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), and lithium triflate ($LiCF_3SO_3$).

Figure 4:
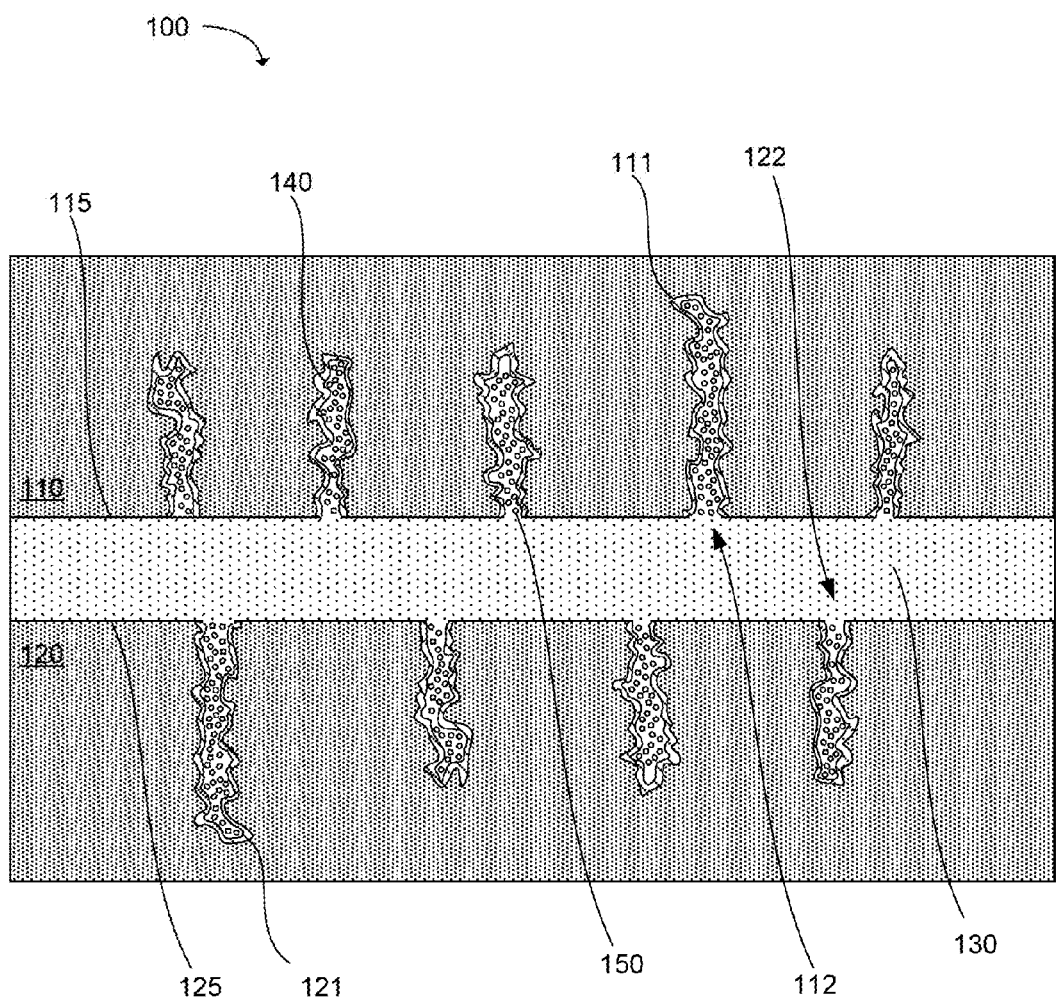
FIG. 4 is cross-sectional view of an energy storage device in accordance with additional invention embodiments.

Referring to FIG. 4, an energy storage device 100 can comprise a first electrode 110 and a second electrode 120 separated from each other by a separator 130. This separator could take any of various forms. For example, in one embodiment, the separator separating the first electrode 110 from the second electrode 120 comprises a polymer membrane.

Figure 5:
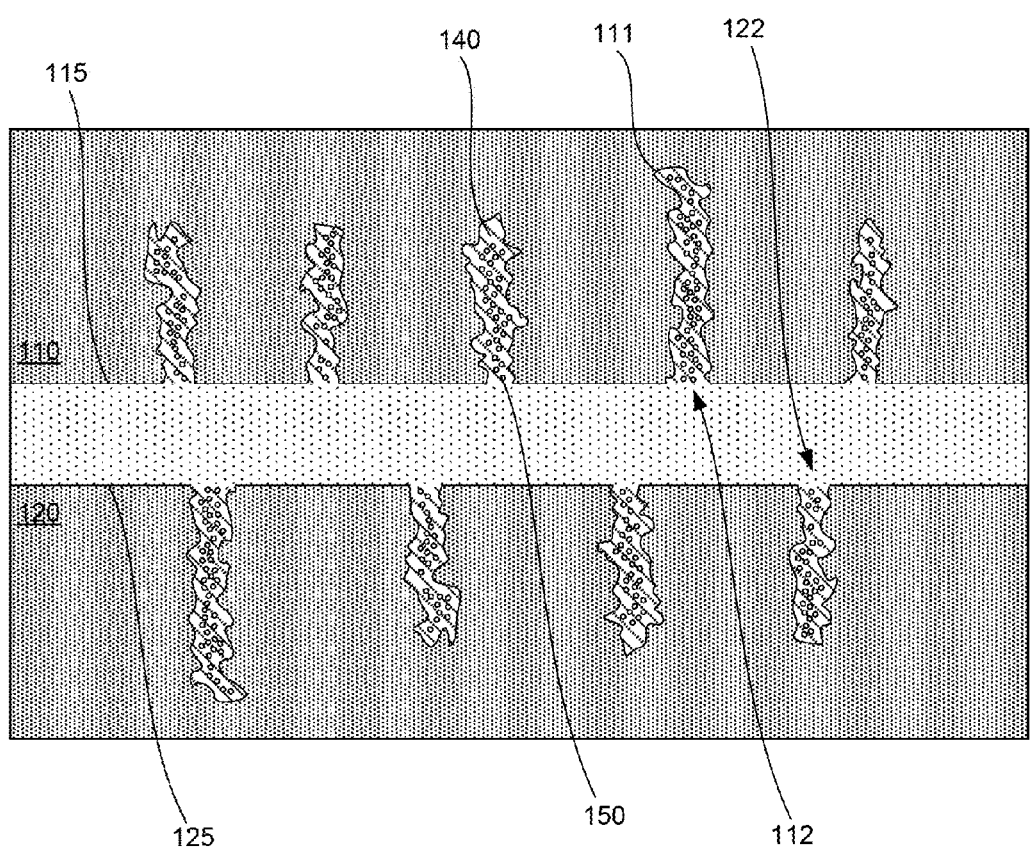
FIG. 5 is cross-sectional view of an energy storage device in accordance with additional invention embodiments.

Referring to FIG. 4 and FIG. 5, at least one of first or second electrodes 110 and 120 comprises a porous structure containing a plurality of channels 111, each one of which has an opening to a surface of the porous structure. In the illustrated embodiments, both first electrode 110 and second electrode 120 comprise such a porous structure. Accordingly, first electrode 110 comprises channels 111 with openings 112 to a surface 115 of the corresponding porous structure and second electrode 120 comprises channels 121 with openings 122 to a surface 125 of the corresponding porous structure. In an embodiment where only one of electrodes 110 and 120 comprises a porous structure with multiple channels, the other electrode can be, for example, a typical lithium-ion cathode comprised of LiCoO (or other Li-metal-oxide/fluoride/phosphide/etc.) particles held together by binding materials.

Various configurations of energy storage device 100 are possible. In the embodiment of FIG. 4, for example, energy storage device 100 comprises two distinct porous structures comprised of different materials (first electrode 110 and second electrode 120) that have been bonded together face-to-face with a separator 130. As another example, an energy storage device can comprise a single planar porous structure in which a first section (first electrode 110) is separated from a second section (second electrode 120) by a trench containing a separator.

Notably, FIG. 4 illustrates an energy storage device comprising a plurality of channels each deposited with the structural material 140 in a layer along the walls of the channels. However, such an embodiment is not limiting. For example, as shown in FIG. 5, an alternate energy storage device 100 can have channels substantially filled with the structural material 140. In other examples, the structural materials do not form a continuous coating but from a disorganized supporting framework inside the channels. In either embodiment, the lithium ions can be diffused through the structural material.

Figure 6:
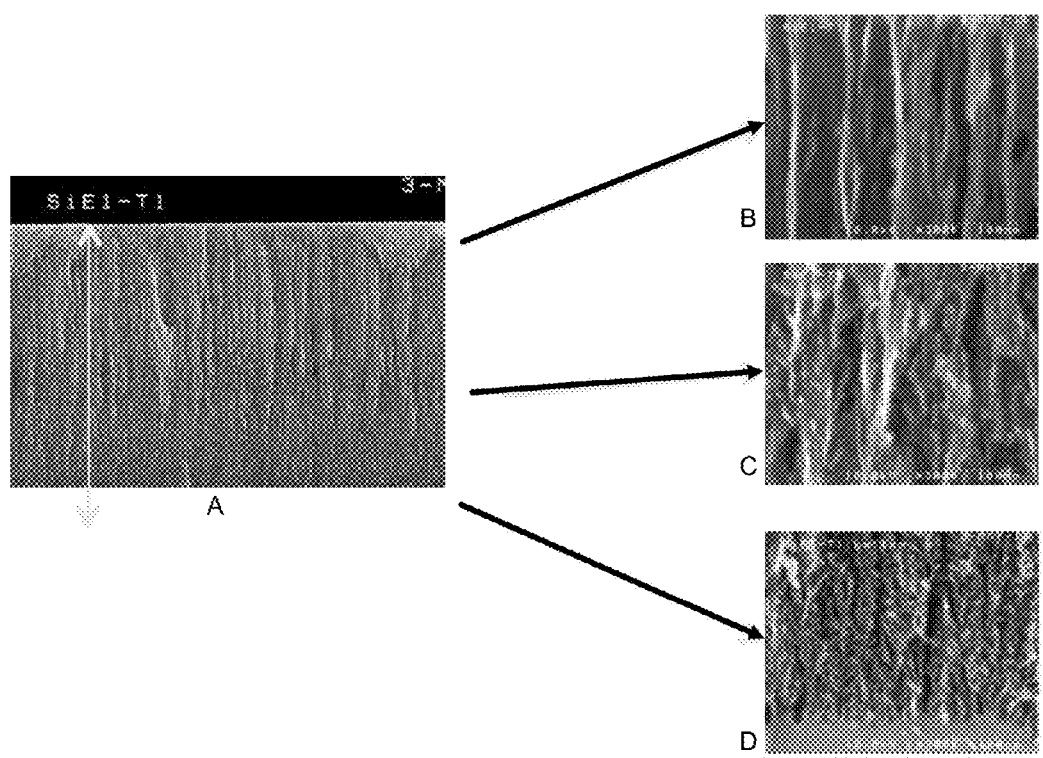
FIGS. 6A-D are scanning electron microscope (SEM) images of porous silicon (A) cross section, and (B-D) at increasing depths of the cross-section in accordance with certain invention embodiments.

It should be noted that the FIG. 4 and FIG. 5 depictions of the porous structures are highly idealized in that, to mention just one example, all of channels 111 and 121 are shown as only extending vertically. However, the channels can branch off in multiple directions to create a tangled, disorderly pattern. For example, FIG. 6 provides scanning electron microscope (SEM) images of a porous silicon substrate (A) with detailed images corresponding to increasing depths of the substrate, (B), (C), and (D).

The disclosed energy storage devices can generally comprise at least two electrodes, a first and a second electrode. Some embodiments include at least an anode having the features discussed herein, but may also have a cathode with such characteristics.

The present energy storage devices can achieve high capacities by using alloys having specific capacities over 1000 mA h/g, 2000 mA h/g, 3000 mA h/g, or even 4000 mA h/g. For example, as mentioned previously, silicon can alloy with lithium up to a stoichiometry of $Li_{22}Si_5$ providing a maximum theoretical specific capacity of 4200 mA h/g. As discussed herein, to overcome stability issues (e.g. disintegration during cycling), the pores or channels of the porous material, for example silicon, can be coated with a structural material, e.g. carbon. In some aspects, the coating can occur either prior or subsequent to addition of electrolyte (e.g. containing lithium). The pairing of the electrolyte, structural material, and the porous material generally conforms to the relationship where lithium has a higher diffusion rate in the structural material than in the porous material. For example, when the porous material is porous silicon, the lithium can diffuse faster in the structural material and have a higher diffusion coefficient than $10^{-10}$ $cm^2/s$ for lithium in silicon. In one embodiment, the higher diffusion rate in the structural material can be several orders of magnitude higher than the diffusion rate in the porous material, (e.g. silicon).

While the present structural material can act as a solid-electrolyte interphase (SEI) layer in addition to providing structural support of the electrode, in some embodiments, the present electrodes can comprise a separate solid-electrolyte interphase layer on the surface of the structural material. Such layers can include titanium or carbon as discussed herein. In one example, the solid-electrolyte interphase layer can be formed by carbonizing the surface of the structural material. In other embodiments the structural support material reacts with the electrolyte to form a stable SEI layer.

Figure 7:
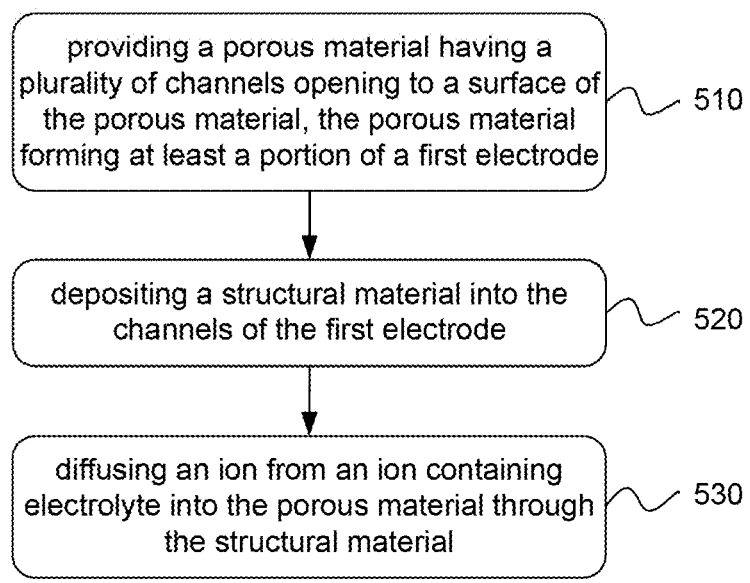
FIG. 7 is a flowchart illustrating a method of manufacturing an energy storage device in accordance with an invention embodiment.

Referring to FIG. 7 is a flowchart illustrating a method of stabilizing an electrode for an energy storage device according to an embodiment of the disclosure. In one embodiment, such a method can include providing a porous material having a plurality of channels opening to a surface of the porous material, the porous material forming at least a portion of a first electrode 510, depositing a structural material into the channels of the first electrode 520, and diffusing an ion from an ion containing electrolyte into the porous material through the structural material 530, wherein the ion has a higher diffusion rate within the structural material than within the porous material. In one aspect, such a method can include etching a material using an etchant, for example an acid solution, to provide a porous material having a plurality of channels or pores opening to a surface of the porous material.

As discussed herein, in some embodiments, the ions can have a higher diffusion rate within the structural material than within the porous material. This allows the ions to diffuse through the structural material to the porous material while providing a structural support to the porous material. Notably, the structural support would be placed under compressive stress during expansion of the porous material during use resulting in a stronger electrode. As discussed herein, such a structural support can provide stability to the electrode resulting in a longer working life. The present embodiment can further include controlling the charge state of the electrode to minimize or prevent disintegration of the electrode during use.

Alternately, after etching, the structural material can be deposited in the channels thereby filling in the channels, or substantially filling the channels. As previously mentioned, the coating of structural material can be thickened to nearly any desired thickness. In some embodiments, after the channels are substantially filled, or at least coated with structural material, the backside of the porous material can be removed thereby exposing the porous region.

In further exemplary detail, the porous structure of the electrode or electrodes of an energy storage device can be created by a wet etch process in which a liquid etchant applied to a surface of the electrode etches away portions of the electrode in a way that is at least somewhat similar to the way water is able to carve channels in rock. This is why each one of the channels has an opening to the surface of the electrode.

With the right etchant, it should be possible to make porous structures having the described characteristics from many materials, resulting in conductive, semiconductive, and insulating materials. As an example, a porous silicon structure may be created by etching a silicon substrate with a mixture of hydrofluoric acid and ethanol. More generally, porous silicon and other porous structures may be formed by such processes as anodization and stain etching.

After etching, as discussed herein, a structural material can be deposited within the channels or pores formed. Deposition of materials can include atomic layer deposition, chemical vapor deposition, electroplating, thermal carbonization, etc. Additionally, some embodiments of the present methods can include depositing a first portion of the electrolyte on the surface prior to depositing the structural material. Further, some embodiments can include removing a non-etched portion of the porous material to form a second surface, with channels opening to the second surface. Regarding porosity, embodiments of the present methods can include controlling at least one of the depositing or diffusing to provide a target porosity, e.g. 50% or more. In one example, the target porosity can allow or be designed to compensate for expansion of the porous material during diffusion of the electrolyte.

Specific embodiments of the present electrodes can be used in the manufacture of an energy storage device, e.g., a rechargeable battery. As such, in one embodiment, the present electrodes can be preloaded with an electrolyte prior to assembly. Additionally, the present methods can include electrically connecting the first electrode to an electrical load and a second electrode to an electrical load, wherein the first electrode is an anode. In another embodiment, the method can include electrically connecting the first electrode to a first potential having a first polarity and electrically connecting the second electrode to a second potential having a second polarity that is opposite the first polarity.

In one example, an electrode for use in an energy storage device can comprise porous silicon having a plurality of channels and a surface, the plurality of channels opening to the surface; and a structural material deposited within the channels; wherein the structural material provides structural stability to the electrode during use.

In one example, an energy storage device can comprise a first electrode comprising a porous material and an ion containing electrolyte, the first electrode having a plurality of channels and a surface, the plurality of channels opening to the surface; wherein the porous material contains a structural material deposited within the channels and wherein the ion has a higher diffusion rate in the structural material than in the porous material.

In one example, the porous material can be silicon.

In one example, the porous material can be germanium.

In one example, the porous material can be tin.

In one example, the porous material can be titanium dioxide.

In one example, the structural material can be deposited within the channels of the porous silicon from a vapor state.

In one example, the structural material allows diffusion of the ion at a higher rate than the porous material.

In one example, the structural material comprises carbon.

In one example, the carbon can include graphite, a carbon-based polymer, or a silicon carbide.

In one example the porous material can be silicon and the structural material can be carbon.

In one example, the structural material can comprise titanium.

In one example, the titanium can include titanium dioxide.

In one example, the electrolyte can comprise a lithium salt including lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), lithium triflate ($LiCF_3SO_3$), or mixtures thereof.

In one example, the higher diffusion rate in the structural material can be an order of magnitude higher than the diffusion rate in silicon.

In one example, the energy storage device can further comprise a second electrode wherein the first electrode is an anode.

In one example, the energy storage device can further comprise a solid-electrolyte interphase layer on a surface of the structural material.

In one example, the solid-electrolyte interphase layer can comprise titanium or carbon.

In one example, the first electrode can have a porosity of 50% or more.

In one example, a method of stabilizing an electrode for an energy storage device can comprise providing a porous material having a plurality of channels opening to a surface thereof, the porous material forming at least a portion of a first electrode; depositing a structural material into the channels of the first electrode; and diffusing an ion from an ion containing electrolyte into the porous material through the structural material; wherein the ion has a higher diffusion rate within the structural material than within the porous material.

In one example, the porous material may be obtained by etching a material.

In one example, the etchant may be an acid solution.

In one example, the acidic solution can comprise hydrofluoric acid.

In one example, the porous material can be selected from the group consisting of silicon, tin, titanium dioxide, and mixtures thereof.

In one example, the porous material can be silicon.

In one example, the structural material can be selected from the group consisting of carbon, titanium dioxide, and mixtures thereof.

In one example, the method can further comprise electrically connecting the first electrode to an electrical load and a second electrode to an electrical load, wherein the first electrode is an anode.

In one example, the method can further comprise electrically connecting the first electrode to a first potential having a first polarity and electrically connecting the second electrode to a second potential having a second polarity that is opposite the first polarity.

In one example, the method can further comprise forming a solid-electrolyte interphase layer on the surface.

In one example, forming can include carbonizing the surface.

In one example, the solid-electrolyte interphase layer can comprise titanium or carbon.

In one example, depositing can include atomic layer deposition of the structural material.

In one example, depositing can include chemical vapor deposition or electroplating of the structural material.

In one example, depositing can include thermal carbonization of the structural material.

In one example, the method can further comprise controlling at least one of the depositing, diffusing, or etching to provide a target porosity.

In one example, the target porosity can allow for expansion of the porous material during diffusion of the electrolyte.

In one example, the method can further comprise depositing a first portion of the electrolyte on the surface prior to depositing the structural material.

In one example, the method can further comprise removing a non-etched portion of the porous material to form a second surface, the plurality of channels opening to the second surface.

The described features, structures, or characteristics may be combined in any suitable manner in one or more embodiments. In this description, numerous specific details are provided, such as examples of layouts, distances, network examples, etc. One skilled in the relevant art will recognize, however, that many variations are possible without one or more of the specific details, or with other methods, components, layouts, measurements, etc. In other instances, well-known structures, materials, or operations are not shown or described in detail but are considered well within the scope of the disclosure.

While the forgoing examples are illustrative of the specific embodiments in one or more particular applications, it will be apparent to those of ordinary skill in the art that numerous modifications in form, usage and details of implementation can be made without departing from the principles and concepts articulated herein. Accordingly, no limitation is intended except as by the claims set forth below.

What is claimed is:

1. An energy storage device comprising:
   a first electrode comprising a porous material and an ion containing electrolyte, the first electrode having a plurality of channels and a surface, the plurality of channels opening to the surface;
   wherein the porous material contains a structural material substantially filling the channels and wherein the ion has a higher diffusion rate in the structural material than in the porous material.

2. The energy storage device of claim 1, wherein the porous material is selected from the list of silicon, tin, germanium, titanium dioxide.

3. The energy storage device of claim 1, wherein the porous material is silicon.

4. The energy storage device of claim 1, wherein the structural material comprises carbon or titanium.

5. The energy storage device of claim 1, wherein the ion containing electrolyte comprises a lithium salt including lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), lithium triflate ($LiCF_3SO_3$), or mixtures thereof.

6. The energy storage device of claim 1, wherein the higher diffusion rate in the structural material is an order of magnitude higher than the diffusion rate in the porous material.

7. The energy storage device of claim 1, further comprising a second electrode wherein the first electrode is an anode.

8. The energy storage device of claim 1, wherein the first electrode has a porosity of 50% or more.

9. The energy storage device of claim 1, wherein the structural material comprises carbon.

10. The energy storage device of claim 1, wherein the structural material comprises graphite, a carbon-based polymer, or a silicon carbide.

11. A method of stabilizing an electrode for an energy storage device, comprising:
    providing a porous material having a plurality of channels opening to a surface of the porous material, the porous material forming at least a portion of a first electrode;
    depositing a structural material into the channels of the porous material to substantially fill the channels with the structural material; and
    diffusing an ion from an ion containing electrolyte into the porous material through the structural material;
    wherein the ion has a higher diffusion rate within the structural material than within the porous material.

12. The method of claim 11, wherein the porous material is selected from the group consisting of silicon, tin, germanium, titanium dioxide, and mixtures thereof.

13. The method of claim 11, wherein the structural material is selected from the group consisting of carbon, titanium dioxide, and mixtures thereof.

14. The method of claim 11, further comprising electrically connecting the first electrode to an electrical load and a second electrode to an electrical load, wherein the first electrode is an anode.

15. The method of claim 11, further comprising electrically connecting the first electrode to a first potential having a first polarity and electrically connecting a second electrode to a second potential having a second polarity that is opposite the first polarity.

16. The method of claim 11, wherein depositing includes thermal carbonization of the structural material.

17. The method of claim 11, wherein the porous material is created by etching a material with an etchant.

18. The method of claim 17, wherein the etchant is an acid solution.

19. The method of claim 17, further comprising controlling at least one of the depositing, diffusing, or etching to provide a target porosity, the target porosity allowing for expansion of the porous material during diffusion of the electrolyte.

20. The method of claim 19, wherein the target porosity is 50% or more.

* * * * *